United States Patent [19]

Vickers

[11] 4,354,874
[45] Oct. 19, 1982

[54] COMPOSITION AND PROCESS FOR CONSOLIDATING SOIL

[75] Inventor: Thomas M. Vickers, Willoughby, Ohio

[73] Assignee: Diamond Shamrock Corporation, Dallas, Tex.

[21] Appl. No.: 316,854

[22] Filed: Oct. 30, 1981

[51] Int. Cl.$^3$ ................................ C09J 1/02
[52] U.S. Cl. .................... 106/74; 106/900; 405/263; 405/266; 405/270
[58] Field of Search .............. 106/74, 84, 287.1, 900; 405/263, 266, 270

[56] References Cited

U.S. PATENT DOCUMENTS

| | | | |
|---|---|---|---|
| 3,028,340 | 4/1962 | Gandon et al. | 252/313 |
| 3,202,214 | 8/1965 | McLaughlin | 166/30 |
| 3,241,990 | 3/1966 | Harrison | 106/74 |
| 3,864,137 | 2/1975 | Van Bonin et al. | 106/75 |
| 4,056,937 | 11/1977 | Suzuki | 61/36 B |
| 4,130,440 | 12/1978 | Nose et al. | 106/74 |
| 4,293,340 | 10/1981 | Metz | 106/84 |

Primary Examiner—James Poer
Attorney, Agent, or Firm—Helen P. Brush

[57] ABSTRACT

An easily pumpable, liquid alkali metal, e.g., sodium silicate composition of controlled gelling characteristics contains water, an alkali metal silicate, glyoxal, optionally a Group I–III metal salt, e.g., calcium chloride, and from 0.005 to 0.10 weight/volume percent of sodium bisulfite/sodium metabisulfite, per liter of composition. This composition is easily applied at elevated temperatures, e.g., 100° F. and higher.

10 Claims, 1 Drawing Figure

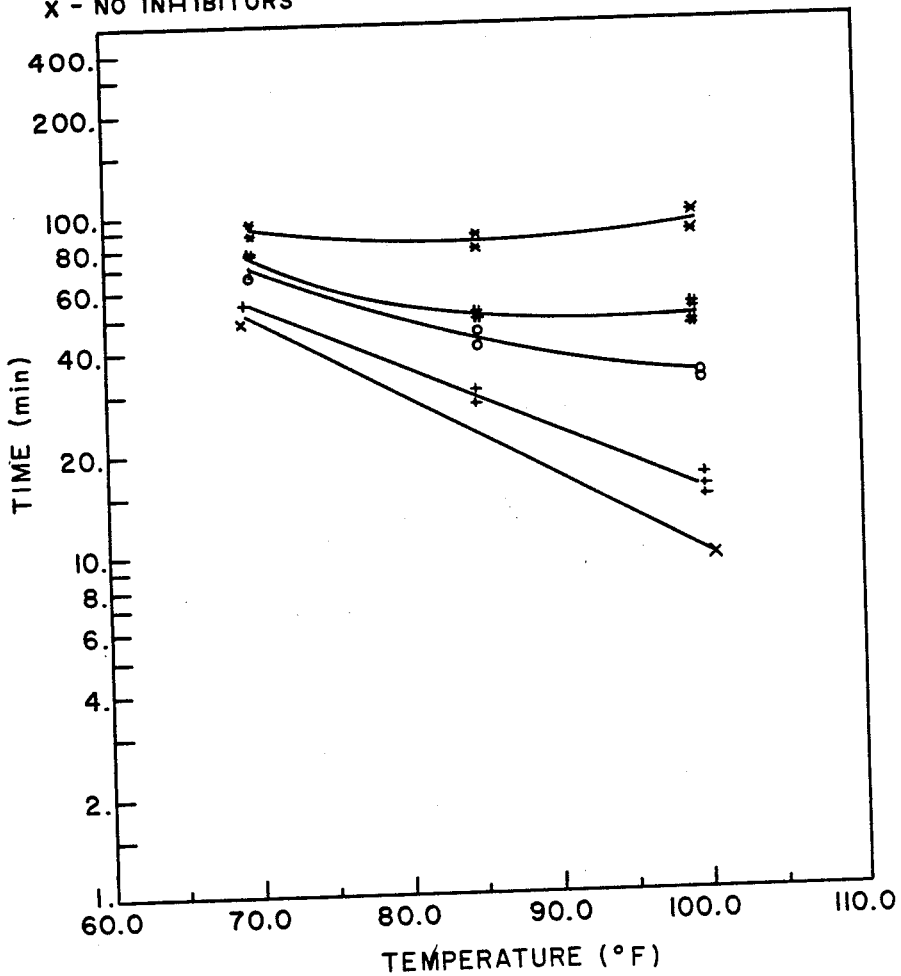

COMPOSITION AND PROCESS FOR CONSOLIDATING SOIL

BACKGROUND OF THE INVENTION

1. Field of the Invention

This invention relates to compositions and to processes for controlling the gelation time of alkali metal silicate-containing compositions. More specifically, it relates to compositions and processes for controlling the gelation time of alkali metal silicate-containing compositions useful for stabilizing or consolidating soil by incorporating into the silicate, along with glyoxal as curing agent, a sodium bisulfite-sodium metabisulfite mixture whereby the gel times of the resulting soil consolidating compositions are significantly inhibited to allow their homogeneous application even at elevated temperatures, e.g., 100° to 200° F.

2. Description of the Prior Art

It has long been known to produce gelled, cement-like masses from aqueous solutions of alkali metal silicates by the addition of salts of metals other than alkali metals, e.g., aluminum or iron. It is further known, as set forth in U.S. Pat. No. 2,968,572 (Peeler), to render soil impermeable to fluid and/or to strengthen it by injecting into said soil a composition comprising an aqueous alkali metal, e.g., sodium silicate, and a soluble amide such as formamide, acetamide, propionamide, butyramide, and the like. During gelation of such compositions and thereafter, however, gaseous ammonia is liberated by the silicate-amide reaction, constituting a hazard to those working nearby, particularly in confined areas.

The alkali metal silicate-containing soil stabilizing compositions described and claimed in U.S. Pat. No. 3,306,758 (Miller), issued Feb. 28, 1967, represent an improvement over the invention set forth in the aforesaid U.S. Pat. No. 2,968,572 in that a lower alkyl aldehyde, e.g., formaldehyde, acetaldehyde, and the like, is incorporated into the silicate-amide mixture as a binding or complexing agent for the ammonia generated during the gelling reaction. Thus, no significant quantities of ammonia vapors are released upon applying and reacting the silicate and amide components.

U.S. Pat. No. 3,028,340 (Gandon et al), issued Apr. 3, 1962, describes and claims a composition suitable for soil stabilization comprising an alkali metal silicate in combination with the linear dialdehyde, glyoxal, as hardener for the silicate. Although safer to apply than the aforesaid silicate-formamide formulations since they generate no hazardous ammonia vapors, such silicate-glyoxal compositions oftentimes gel too rapidly for practical application, particularly when used at elevated temperatures.

SUMMARY OF THE INVENTION

I have now found that the gel times of alkali metal silicate-glyoxal soil stabilizing compositions may be inhibited by incorporating into said silicate-glyoxal compositions a sodium bisulfite-sodium metabisulfite mixture ($NaHSO_3/Na_2S_2O_5$). The gel times of the resulting compositions are significantly inhibited to allow for the homogeneous application thereof to the soil at elevated temperatures, e.g., 100° to 200° F.

BRIEF DESCRIPTION OF THE DRAWING

The advantages of the invention will become apparent upon reading the following detailed description and upon reference to the drawing, FIG. 1, which is a graph showing the slower gel times at different temperatures of silicate-glyoxal compositions which contain varying percentages of $NaHSO_3/Na_2S_2O_5$ and reactive salt in accordance with this invention, compared to the gel times of straight silicate-glyoxal compositions at these same temperatures.

DESCRIPTION OF THE PREFERRED EMBODIMENTS

As used herein in the specification and claims, the term "alkali metal silicate" is intended to refer to alkali metal silicates having an alkali metal oxide:silicon dioxide weight ratio within the range from about 1.0:3.0–4.0, notably, sodium silicates having a sodium oxide:silicon dioxide weight ratio within the range from about 1.0:3.0–4.0, preferably about 1.0:3.5. In practice, either an anhydrous alkali metal silicate, e.g., sodium metasilicate or a silicate solution as commercially obtained, may be employed herein as the alkali metal silicate component. The anhydrous material will, of course, be dissolved in sufficient water to provide a solution of the desired solids concentration. An especially preferred material is an aqueous sodium silicate having a sodium oxide:silicon dioxide ratio of about 1.0:3.2–3.3, and having a $Na_2O$-$SiO_2$ solids content of about 35 percent to 50 percent, most preferably, a $Na_2O$-$SiO_2$ solids content of about 35 percent to 45 percent by weight. The term "alkali metal" as used in the specification and claims is intended to refer to the various alkali metals, i.e., sodium, potassium, lithium, rubidium, cesium, and mixtures thereof. Silicates of potassium and sodium are more generally available. In particular, sodium silicate solutions, being commercially available in a wide variety of solids concentrations and $Na_2O$:$SiO_2$ ratios, are more widely used and are presently preferred in practice of the invention. Accordingly, particular reference is made hereinafter to sodium silicates. The silicate may be employed undiluted as purchased, or it may be diluted with water.

In general, the glyoxal component of the composition may be incorporated therein either as an anhydrous solid or as a 40 percent aqueous solution, both of which forms are available commercially. Being more convenient and easily handled, however, the aqueous glyoxal solution is preferred. Generally, from about 0.25 mole to 1.05 moles of glyoxal may be employed per liter of total composition to provide, in combination with the bisulfite/metabisulfite additive, a soil stabilizing composition which is more flexible in use at higher temperatures than those silicate compositions containing glyoxal alone as gelling agent. In presently preferred practice, from about 0.35 to 0.70 mole of glyoxal is employed per liter of total composition.

The $NaHSO_3/Na_2S_2O_5$ additive, which is used in this invention to modify the gelation characteristics of the silicate-glyoxal composition, and as obtained commercially, is a mixture of varying percentages of the two aforesaid salts. The specific mixture that was used herein and is illustrated in the examples is composed of 59.6 percent of $NaHSO_3$ and 40.4 percent of $Na_2S_2O_5$. In practice, it has been found that by incorporating as little as 0.025 percent of this mixture per liter of composition, the gelation time of the 40 percent silicate-6 percent glyoxal formulation is delayed from 11 minutes to several hours at 100° F. Reducing the concentration of the additive 0.005 percent, i.e., to a concentration of 0.020 percent inhibitor, provides an inhibited gel time of about 2 hours at 100° F., by comparison to the straight glyoxal composition. Incorporation of as little as 0.010 percent additive is found to more than double the gelation time of the 40 volume percent silicate-6 volume percent glyoxal formulation at 100° F. Since silicate gelation may be so drastically inhibited through the use of such minor percentages of the $NaHSO_3/Na_2S_2O_5$ mixture, concomitant use of low percentages of a gelation accelerator, such as calcium chloride, will maintain the desired delay in gelation of the silicate while the calcium chloride serves to initially impart a higher degree of water insolubility to the soil stabilizing composition.

As indicated heretofore, from 0.005 to 0.10 volume percent of the $NaHSO_3/Na_2S_2O_5$ additive may generally be used herein to provide significant inhibition of silicate gelling by glyoxal. Also, in practice of the invention, as will be shown hereinafter by specific example, accelerators such as calcium chloride which is incorporated with higher levels of the bisulfite/metabisulfite additive will provide soil stabilizing compositions of enhanced compressive strength upon curing, while maintaining the inhibited gel time desired. When employed, the reactive salt is incorporated as an aqueous solution at concentrations ranging from 0.05 volume percent to 0.15 volume percent of salt. In present practice, the required quantity of calcium chloride is easily dissolved in the required quantity of water in the composition.

The compositions of this invention will, of course, incorporate sufficient water to render them fluid. Generally, at least a portion of the necessary water will be supplied by using a commercial aqueous alkali metal silicate and the $NaHSO_3/Na_2S_2O_5$ salt as described above, with additional water being supplied, if desired, as by admixture of the water with the glyoxal and/or with any reactive salt solution when employed.

It will be appreciated, of course, that the amounts of glyoxal, bisulfite/metabisulfite, added water, and optionally a reactive salt used in proportion to the silicate, as well as the amount of soil treated with a given quantity of such a composition, varies widely depending upon the porosity, permeability and type of soil, nature of the substrata, if subsoil applications are intended, and the like. Accordingly, it generally is not feasible to define in terms of proportions a composition which represents an optimum material for use in all types of soil solidification and/or stabilization operations.

However, effective soil stabilization compositions of the present invention generally comprise from about 10 to 70 percent, preferably about 30 to 50 percent by volume of an aqueous alkali silicate having an alkali metal oxide:silicon dioxide weight ratio within the range of 1.0:3.0–4.0; about 0.25 to 1.05 moles, preferably 0.35 to 0.70 mole of glyoxal per liter of composition; about 0.005 to 0.10, preferably about 0.010 to 0.025 weight/volume percent of the $NaHSO_3/Na_2S_2O_5$ additive per liter of composition; and the balance of the soil stabilizing composition being added water (water in addition to that separately admixed with either alkali silicate, glyoxal, additive, and optionally reactive salt). No water need be added, or, conversely, it may be present in an amount of 0.5 to 8.5 times the volume of aqueous commercial silicate used. However, at temperatures greater than room temperature and when a high strength gel is required, it is better to minimize the amount of water added to the aqueous commercial silicate.

The compositions of this invention may be used particularly for increasing the load-bearing capacity of soils, for arresting settlement and lateral movement of foundations, and for controlling the flow of water in subterranean engineering projects such as tunnels and mines. The term "soil" as used in the specification and claims is intended to refer to various types and compositions of soil, including sand, loam, porous or fissured rock, and the like, for example, as described in pages 614 to 633 of Vol. 12 of the *Kirk-Othmer Encyclopedia of Chemical Technology*, First Ed.

The soil stabilizing compositions of this invention provide many advantages to the routineer. They are easily pumpable liquids which may be simply injected into the soil site. They accomplish soil stabilization in customized gel times economically. Finally, the soil stabilizing compositions of this invention release no noxious fumes or objectionable residues which could constitute a health hazard to persons applying them.

In addition to their utility as soil stabilizing materials, the compositions of this invention may likewise be useful, either by themselves or in combination with other adjuvants, as coatings for imparting strength, water-impermeability, fire resistance and/or chemical corrosion resistance to paper, roofing materials, wood, textiles, metal surfaces, water lines, and structural materials, e.g., building materials of various composition or insulation. They may also be employed as adhesives for binding, gluing, briquetting, pelletizing or agglomerating materials such as flooring, asbestos, roofing granules, and the like, and as absorbing or adsorbing materials for encapsulating, confining or otherwise fixing liquids, gases or solids hazardous to the environment. Further, these compositions, either as gels or in hardened granular form, may find utility as chemical carriers, and as flocculants for purifying and disinfecting water.

For a fuller understanding of the nature and objects of this invention, the following specific examples are given. These examples, however, are not to be construed as limiting the invention in any way. All percentages, proportions and quantities as may be given in these examples are by weight, unless indicated otherwise.

EXAMPLE 1

This example illustrates the gel inhibiting characteristics of the sodium bisulfite/sodium metabisulfite mixture when added to sodium silicate in combination with glyoxal curing agent. For the test, 1.250 g of sodium bisulfite/sodium metabisulfite ($NaHSO_3/Na_2S_2O_5$) (analysis=59.6 percent $NaHSO_3$; 40.4 percent $Na_2S_2O_5$) was dissolved in sufficient water to make 25 ml of solution with a concentration of 5 weight/volume percent of the salt. For each test, 18 ml of 40 percent aqueous glyoxal was added to the volume of water shown in the table below. Into each of a series of containers positioned in a water bath maintained at 100° F. ($\pm$1° F.) was added 120 ml (168 g) of liquid sodium silicate, Grade 40 (1 $Na_2O$:3.22 $SiO_2$, average solids content, 38.3 percent by weight, 41.5° Bé at 20° C.). Quantities of the gel inhibitor as shown in the table were added to the glyoxal-water solutions, and the resulting solutions were added to the liquid silicate with thorough blending.

After blending, the time was recorded and then each composition was observed for gelling. The time at which the consistency of the composition became like pudding was recorded, its gelling time being the difference between the initial and final times recorded. For each concentration of silicate, a straight silicate-glyoxal formulation was prepared as a control. Using this procedure, results are as follows:

TABLE 1

| Sample No. | Added Water ml | Inhibitor Solution ml | Inhibitor Solution Wt/Vol % | Gel Time 100° F. (min) |
|---|---|---|---|---|
| 40% Silicate Grout* 6% Glyoxal | | | | |
| 1 | 161.4 | 0.6 | 0.01 | 26.5 |
| 2 | 161.1 | 0.9 | 0.015 | 50 |
| 3 | 160.8 | 1.2 | 0.020 | 164.0 |
| 4 | 160.5 | 1.5 | 0.025 | 253 |
| Control | 162.0 | — | — | 11 |
| 20% Silicate Grout* 4% Glyoxal | | | | |
| 1a | 227.1 | 0.9 | 0.015 | 51 |
| 2a | 227.4 | 0.6 | 0.010 | 43 |
| 3a | 227.7 | 0.3 | 0.005 | 29 |
| Control | 228.0 | — | — | 23 |

*Percentages are by volume.

As the above results show, the gel time of the silicate by the glyoxal curing agent becomes more strongly inhibited as the concentration of the sodium bisulfite/metabisulfite mixture is increased in the composition.

EXAMPLE 2

Formulations as set forth in Example 1 above were again prepared at 100° F. In these formulations, minor quantities of a 5 percent solution of calcium chloride ($CaCl_2$) were also included as a curing agent or curing accelerator. The results obtained are as follows:

TABLE 2

| Sample No. | Inhibitor Solution Wt/Vol. % | $CaCl_2$ Wt/Vol. % | Gel Times at 100° F. (min) |
|---|---|---|---|
| 40% Silicate* 6% Glyoxal | | | |
| 5 | 0.025 | 0.05 | 99 |
| 6 | 0.025 | 0.10 | 35 |
| 7 | 0.025 | 0.15 | 16 |
| 8 | 0.020 | 0.05 | 51 |
| 9 | 0.020 | 0.15 | 10 |
| Control | — | — | 11 |
| 20% Silicate* 4% Glyoxal | | | |
| 5a | 0.020 | 0.05 | 36 |
| Control | — | — | 23 |

*As described previously

These values illustrate that the gel times of those silicate-glyoxal compositions which contain the $NaHSO_3/Na_2S_2O_5$ inhibitor can be shortened as desired by incorporation of prescribed quantities of a secondary accelerator such as calcium chloride.

EXAMPLE 3

This example illustrates that the gel or set time of a silicate composition of this invention can be customized and adapted for a particular application by varying its preparation temperature.

For the test, compositions were first prepared at 70° F. which contained, on a volume basis, 40 percent Grade 40 sodium silicate solution, 6 percent of 40 percent aqueous glyoxal, varying quantities of a 5 weight/volume percent solution of sodium bisulfite/sodium metabisulfite and a 5 weight/volume percent solution of calcium chloride as shown in the following table, and the balance, water, to make 300 ml of composition. The gel times of these compositions were recorded.

The same compositions were then prepared at 85° F. and at 100° F. and their gel times recorded. Straight silicate-glyoxal compositions were prepared and tested at different temperatures as controls. Results are as follows:

TABLE 3

| Sample | Temperature °F. | $NaHSO_3/Na_2S_2O_5$ Wt/Vol % | $CaCl_2$ ml | Average Gel Time (min) |
|---|---|---|---|---|
| 1 | 70 | (0.025) | 1.5 | 9 | 57 |
| | 85 | | 1.5 | 9 | 28.5 |
| | 100 | | 1.5 | 9 | 16 |
| 2 | 70 | (0.020) | 1.2 | 3 | 81 |
| | 85 | | 1.2 | 3 | 53 |
| | 100 | | 1.2 | 3 | 31 |
| 3 | 70 | (0.025) | 1.5 | 6 | 75 |
| | 85 | | 1.5 | 6 | 46 |
| | 100 | | 1.5 | 6 | 35 |
| 4 | 70 | (0.025) | 1.5 | 3 | 98 |
| | 85 | | 1.5 | 3 | 87 |
| | 100 | | 1.5 | 3 | 57 |
| Control | 70 | — | — | — | 61 |
| | 85 | | — | — | 28 |
| | 100 | | — | — | 11 |

As illustrated, the temperature at which the above silicate compositions are prepared likewise affects their gel times as well as the particular inhibitor or inhibitor-accelerator combinations. These facts are graphically illustrated in the accompanying drawing in which gel time (in minutes) is plotted against the temperature (°F.) at which the samples were prepared.

EXAMPLE 4

To determine whether or not the sodium bisulfite/sodium metabisulfite additive will inhibit the gel time of known silicate-acidogen systems other than those with glyoxal, the following experiments were carried out:

A. A solution was prepared containing, by volume 40 percent Grade 40 sodium silicate, 4.5 percent of diacetin, 0.25 percent of 5 percent calcium chloride, and the balance water. The gel time of this composition was found to be 9 minutes. Another like solution was prepared, adding 0.025 percent of 5 percent weight/volume solution of sodium bisulfite/sodium metabisulfite as gelation inhibitor. The gel time of this composition was also 9 minutes. Thus, the bisulfite/metabisulfite additive did not inhibit the gel time of a silicate composition containing diacetin as acidogen.

B. A solution was prepared containing, by volume, 40 percent of Grade 40 sodium silicate, 6 percent formamide, 0.15 percent of 5 percent aqueous calcium chloride, and the balance water. The average gel time of this composition was found to be 103 to 104 minutes. This solution was prepared again, also incorporating 0.025 percent (1.5 ml) of a 5 weight/volume percent solution of sodium bisulfite/metabisulfite mixture. The gel time of this solution was also 104 minutes. Thus, the bisulfite/metabisulfite additive did not inhibit the gel time of silicate compositions containing formamide as acidogen. Accordingly, this inhibitor appears to be somewhat selective in its gel inhibiting action on silicate compositions which contain glyoxal as acidogen.

EXAMPLE 5

To test for compressive strength of soil impregnated with the gel-inhibited silicate/glyoxal compositions of this invention, 100 ml of Ottawa Sand (ASTM C-109) was measured into each of 15 tri-pour beakers containing approximately 36 ml of a composition. The composition was composed of 40 percent by volume of Grade 40 sodium silicate solution and other components as listed in the table below. Each composition was thoroughly mixed on a vibramixer to remove any entrapped air bubbles. The beakers were then capped and stored at room temperature until tested for compressive strength.

After 2-days storage, five of the compacted sand samples were removed for compressive strength measurement. This measurement was made on an Instron Tester, Model 1123, applying the load at a rate of 5 mm/min (dr0.2 inch/min) and recording the maximum load (pressure) which could be applied to each sample before structural damage occurred. These values were divided by 2.2 square inches, the area of the tri-pour beaker. Five more samples were tested in the same manner after 7-days aging, and the remaining samples after 30-days aging. The recorded pressure readings were converted to kilograms/cm$^2$. Using this procedure, results are as follows:

TABLE 4

| Sample | Reactants Added | Average Compressive Strength (kilograms/cm$^2$) | | |
|---|---|---|---|---|
| | | 2 days | 7 days | 30 days |
| A | 6% Glyoxal[1]<br>Water-balance | 5.5 | 5.6 | 9.1 |
| B | 6% Glyoxal<br>0.02% NaHSO$_3$/<br>Na$_2$S$_2$O$_5$<br>Water-balance | 3.1 | 3.6 | — |
| C | 6% Glyoxal<br>0.02% NaHSO$_3$/<br>Na$_2$S$_2$O$_5$<br>0.05% CaCl$_2$<br>Water-balance | 3.5 | 3.9 | 9.4 |
| D | 6% Glyoxal<br>0.025% 5% NaHSO$_3$/<br>Na$_2$S$_2$O$_5$<br>0.10% CaCl$_2$<br>Water-balance | 3.4 | 4.0 | — |
| E | 6% Glyoxal<br>0.015% NaHSO$_3$/<br>Na$_2$S$_2$O$_5$<br>Water-balance | 5.1 | 5.5 | 10.3 |

[1]Forty percent glyoxal in water

These data indicate that compositions of this invention will inhibited gel times exhibit adequate strength for numerous applications, e.g., soil hardening or stabilizing.

EXAMPLE 6

To determine whether or not both components of the alkali metal silicate gelling inhibitor of this invention, i.e., the sodium bisulfite/sodium metabisulfite mixture, possess gel inhibiting characteristics, a series of silicate compositions were prepared and tested at 100° F. as follows:

A standard solution was prepared containing by volume 40 percent of Grade 40 sodium silicate solution, 6 percent of a 40 percent solution of glyoxal, 0.15 percent of a 5 weight/volume percent of calcium chloride, and the balance water. The gel time of this solution was 7 minutes.

The standard solution was prepared again, also incorporating 0.025 percent (weight/volume) of the sodium bisulfite/sodium metabisulfite used herein. The gel time of this solution averaged about 16 minutes.

Again, the standard solution was prepared, incorporating in this instance 0.025 weight/volume percent of sodium sulfite (Na$_2$SO$_3$). The gel time of this solution was about 14 minutes.

Finally, the standard solution was prepared incorporating, as the inhibitor, 0.025 weight/volume percent of sodium metabisulfite. The gel time of this solution was about 23 minutes.

These results are believed to indicate that sodium metabisulfite is the main inhibiting component of the sodium bisulfite/sodium metabisulfite silicate gel-inhibiting additive of this invention.

What is claimed is:

1. In a liquid alkali metal silicate composition curable to a solid upon standing and comprising water, an alkali metal silicate and glyoxal, the improvement which comprises incorporating into said composition a sodium bisulfite/sodium metabisulfite mixture as a retarder for silicate gelling, whereby gelling of the resulting composition is significantly inhibited by comparison to that of a liquid alkali metal silicate-glyoxal composition, and it is easily pumpable at an application temperature of 100° F. or higher.

2. The composition of claim 1 which comprises 10 to 70 percent by volume of an aqueous alkali metal silicate having an alkali metal oxide:silicon dioxide ratio of 1.0:3.0–4.0; about 0.25 to 1.05 moles of glyoxal per liter of composition; about 0.005 to 0.10 weight to volume percent of sodium bisulfite/sodium metabisulfite mixture per liter of composition; and the balance water.

3. The composition of claim 1 in which the composition of the sodium bisulfite/sodium metabisulfite additive is about 60 percent bisulfite and about 40 percent metabisulfite, by weight.

4. The composition of claim 2 wherein the aqueous alkali metal silicate is sodium silicate containing from 25 to 50 percent solids by weight.

5. The composition of claim 2 which additionally contains a Group I-III metal salt reactive with the alkali metal silicate for imparting water insolubility to the resulting silicate gel, which metal salt is sodium aluminate, aluminum chloride, copper sulfate, zinc chloride or calcium chloride.

6. The composition of claim 5 wherein the Group I—III metal salt is calcium chloride.

7. In a method for stabilizing soil which comprises contacting said soil with a sole liquid composition comprising 10 to 70 percent by volume of an aqueous alkali metal silicate having an alkali metal oxide:silicon dioxide ratio of 1:3.0–4.0; about 0.25 to 1.05 moles of glyoxal per liter of composition; and water, the improvement which comprises adding to said composition from 0.005 to 0.10 weight to volume percent of a sodium bisulfite/sodium metabisulfite mixture per liter of composition, whereby gelling of the resulting composition is significantly inhibited by comparison to that of a liquid alkali metal silicate-glyoxal composition and said composition is easily pumpable at an application temperature of 100° F. or higher.

8. The method of claim 7 wherein the soil stabilizing composition additionally contains a Group I-III metal salt reactive with the alkali metal silicate to impart water insolubility to the resulting silicate gel.

9. The method of claim 8 wherein the Group I-III metal salt is calcium chloride.

10. The method of claim 9 wherein the soil stabilizing composition contains 30 to 50 percent by volume of an aqueous sodium silicate having a sodium oxide:silicon dioxide ratio of 1:3.0–4.0; from about 0.35 to 0.70 mole of glyoxal per liter of total composition; from about 0.010 to 0.025 weight/volume percent of the sodium bisulfite/sodium metabisulfite; from about 0.05 to 0.15 weight/volume percent of calcium chloride per liter of composition; and the balance water.

* * * * *